H. S. GREENE.
ANTIFRICTION BEARING.
APPLICATION FILED APR. 10, 1913.
1,100,559.
Patented June 16, 1914.
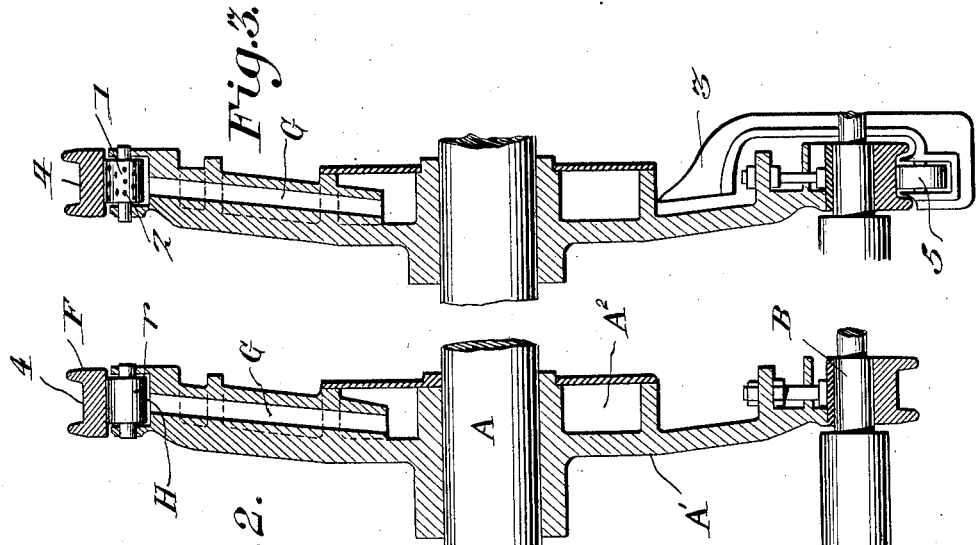
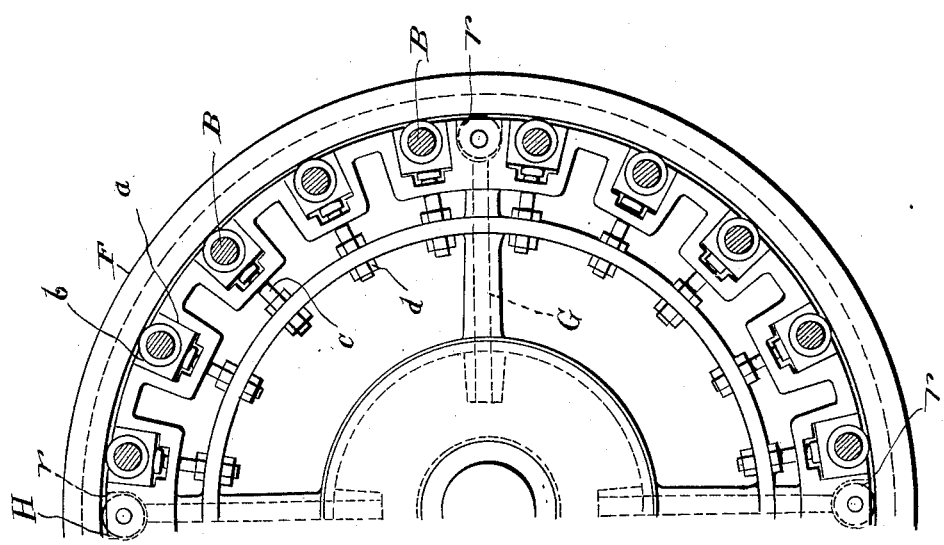

UNITED STATES PATENT OFFICE.

HARRY S. GREENE, OF WOONSOCKET, RHODE ISLAND.

ANTIFRICTION-BEARING.

1,100,559.  Specification of Letters Patent. Patented June 16, 1914.

Application filed April 10, 1913. Serial No. 760,142.

*To all whom it may concern:*

Be it known that I, HARRY S. GREENE, citizen of the United States, residing at Woonsocket, in the county of Providence and State of Rhode Island, have invented new and useful Improvements in Antifriction-Bearings, of which the following is a specification.

My present invention has to do with anti-friction bearings for the napping rolls of planetary napping machines; and it has for one of its objects to provide means for adequately and uniformly lubricating the anti-friction bearings so as to reduce the friction practically to *nil*.

The invention also contemplates the utilization of the lubricating means for centering the anti-friction ring—*i. e.*, maintaining the position of the said ring relative to the shaft of the napping drum without interfering with the free revolution of the ring about the shaft.

The invention further contemplates the provision of means on the spider for holding the anti-friction ring or hoop against casual lateral movement and for serving as an auxiliary to the lubricant applying rollers in centering the ring or hoop.

Other advantageous characteristics of the invention will be fully understood from the following description and claims when the same are read in connection with the drawings, accompanying and forming part of this specification, in which—

Figure 1 is an end elevation of one end of a planetary napping machine drum constructed in accordance with my invention; it being understood that the half not illustrated is identical with the half shown. Fig. 2 is a diametrical section of the same. Fig. 3 is a diametrical section of a modification hereinafter specifically referred to.

Referring by letter and numeral to the drawings and more particularly to Figs. 1 and 2 thereof: A is the shaft of the planetary napping machine drum. A' is one of the spiders or heads fixed with respect to the shaft, and $A^2$ is a lubricant reservoir formed in part by the spider and surrounding and located adjacent the shaft. The said chamber may be provided with a normally closed filling aperture, but this I have deemed it unnecessary to illustrate.

Formed in the perimeter of the spider and disposed radially are guide-ways $a$, and arranged and movable radially in said guideways are bearing blocks $b$. In the preferred embodiment of my invention, the inward movement of the said bearing blocks is limited by bolts $c$, adjustably fixed by nuts $d$, and when deemed expedient the said bolts may be positioned so as to hold the journals of the napping rolls against the inner surface of the anti-friction ring or hoop.

The napping rolls are lettered B and their journals are carried by and adapted to turn about their axes in the blocks or carriers $b$. The said journals of the rolls B bear outwardly against the inner surface of the ring or hoop F, and the said ring or hoop is preferably, though not necessarily, provided with a circumferential groove, as indicated by 4 in Fig. 2.

In furtherance of my present invention, I provide in the spider A' ducts G which extend radially outward from the reservoir $A^2$ to chambers H formed in the perimeter of the spider. Suitably mounted so as to freely turn in the said chambers H are rollers $r$, which have for their function to receive the lubricant that is moved outwardly through the ducts G by centrifugal action, and apply the said lubricant to the inner surface of the ring F so as to thoroughly lubricate the same. When desired, the rollers which are numbered 1 in Fig. 3 may be made hollow and provided with apertures 2, this in order that lubricant may enter and leave the rollers through the said apertures.

It will be manifest from the foregoing that the lubricant-applying rollers being positioned at fixed distances from the shaft A will serve to efficiently center the ring or hoop F, and this while assisting rather than retarding the free revolution of the ring or hoop about the shaft. It will also be appreciated that the rotation of the journals of the napping rolls against the inner surface of the revolving ring or hoop will receive lubricant from said ring or hoop and thereby will be attended by practically no friction.

The revolution of the ring or hoop F incidental to the rotation of the napping drum may be effected by the napping rolls which are rotated about their axes by conventional or any other suitable means, or if preferred, the ring or hoop F may be revolved by extraneous means as disclosed in my Letters Patent No. 1,020,280, dated March 12, 1912.

When regarded as necessary, any auxiliary means may be employed for assisting in the centering of the ring or hoop F and for holding the same against casual lateral movement. For instance the spider may be provided with a bracket 3, having rollers 5, arranged to operate upon the ring F and in the groove 4 thereof. When desired, wicking or other suitable absorbent material may be placed in the ducts G to regulate the supply of the lubricant to the rollers r or 1.

While my improvements are designed more especially for embodiment in the drum of a planetary napping machine, I would have it understood that the lubricating and other means described, may be embraced in any machine to which they are applicable without involving departure from the scope of my claimed invention.

Having described my invention, what I claim and desire to secure by Letters-Patent, is:

1. The combination of a spider having a lubricant reservoir and a chamber in the periphery of the spider and also having a duct extending outwardly from the reservoir to the chamber, a lubricant-applying roller mounted in said chamber, journals disposed in the spider at the perimeter thereof, and a revoluble ring or hoop surrounding the lubricant-applying roller and the journals and contacting with the same.

2. The combination of a spider having a lubricant reservoir and chambers at intervals in its periphery and also having ducts extending outwardly from said reservoir to said chambers, combined lubricant-applying and centering rollers mounted to turn in the chambers in fixed relation to the center of the spider, journals disposed in the spider at the perimeter thereof, and a revoluble ring or hoop surrounding the lubricant-applying and centering rolls and the journals and contacting therewith.

3. The combination of a revoluble body, a journal carried in said body at a point off the center thereof, a revoluble hoop surrounding and contacting with the journal, and means carried by the body for utilizing centrifugal action to apply lubricant to the inner surface of the hoop.

4. The combination of a revoluble spider, journals carried in the spider at the perimeter thereof, a revoluble ring or hoop surrounding and contacting with the journals, a lubricant reservoir carried by the spider, and means also carried by the spider for utilizing centrifugal action to transfer lubricant from the reservoir to the inner surface of the ring or hoop.

5. The combination of a spider having guideways and lubricant chambers in its perimeter and also having a lubricant reservoir and ducts intermediate the same and the chambers, lubricant-applying rollers mounted in the chambers and in fixed relation to the center of the spider, bearing blocks movable in the guideways of the spider, journals disposed in said bearing blocks, and a revoluble ring or hoop surrounding and contacting with the lubricant-applying rollers and the journals.

6. The combination of a spider having guideways and lubricant chambers in its perimeter and also having a lubricant reservoir and ducts intermediate the same and the chambers, lubricant-applying rollers mounted in the chambers and in fixed relation to the center of the spider, bearing blocks movable in the guideways of the spider, adjustably-fixed means carried by the spider for limiting the inward movement of said blocks, journals disposed in the blocks, and a revoluble ring or hoop surrounding and contacting with the lubricant-applying rollers and the journals.

7. The combination of a spider having a lubricant reservoir and a peripheral chamber and also having a duct extending outwardly from the reservoir to the chamber, a hollow foraminous lubricant-applying roller mounted to turn in said chamber, journals carried by the spider at the perimeter thereof, and a revoluble ring or hoop surrounding and contacting with the lubricant-applying roller and the journals.

In testimony whereof I have hereunto set my hand in presence of two subscribing witnesses.

HARRY S. GREENE.

Witnesses:
FRANCES L. COYLE,
WILLIAM L. GREENE.

---

Copies of this patent may be obtained for five cents each, by addressing the "Commissioner of Patents, Washington, D. C."